United States Patent [19]

Dixon et al.

[11] 4,412,048

[45] Oct. 25, 1983

[54] SOLVENTLESS UV DRYABLE B-STAGEABLE EPOXY ADHESIVE

[75] Inventors: George D. Dixon; Nancy W. Carlson, both of Needham, Mass.; Howard E. Saunders, Murrysville, Pa.

[73] Assignee: Westinghouse Electric Corp., Pittsburgh, Pa.

[21] Appl. No.: 301,169

[22] Filed: Sep. 11, 1981

[51] Int. Cl.$^3$ .................... C08L 63/00; C08L 63/02
[52] U.S. Cl. .................. 525/524; 204/159.14; 204/159.15; 204/159.18; 428/413
[58] Field of Search .............. 204/159.15, 159.14, 204/159.18; 525/524; 428/413

[56] References Cited

U.S. PATENT DOCUMENTS

| | | | |
|---|---|---|---|
| 3,794,576 | 2/1974 | Watt | 525/524 |
| 3,936,557 | 2/1976 | Watt | 428/211 |
| 4,222,835 | 9/1980 | Dixon | 204/159.16 |
| 4,252,592 | 2/1981 | Green | 204/159.14 |
| 4,252,593 | 2/1981 | Green | 204/159.15 |

*Primary Examiner*—Wilbert J. Briggs, Sr.
*Attorney, Agent, or Firm*—R. D. Fuerle

[57] ABSTRACT

Disclosed is a solventless UV dryable B-stageable epoxy adhesive which comprises about 40 to about 70 pbw of a solid thermally curable epoxy having a molecular weight between about 650 and about 4000, a thermal curing agent for the thermally curable epoxy which is stable at room temperature and soluble on the adhesive in an amount of about stoichiometric to about 50% by weight in excess of stoichiometric, up to about 2 pbw of an accelerator for the thermal curing agent which is soluble in the adhesive, about 25 to about 60 pbw of a liquid UV curable resin having a molecular weight of less than about 700 which is either an epoxy, an acrylic, or a mixture thereof and which is a diluent for the thermally curable epoxy, about 1 to about 10 pbw of a UV photoinitiator for the UV curable resin, up to about 20 pbw of a reactive diluent, up to about 5 pbw of a flow control agent, up to about 1 pbw of a surfactant, and up to about 10 pbw of a tri or higher functional epoxy.

16 Claims, No Drawings

4,412,048

SOLVENTLESS UV DRYABLE B-STAGEABLE EPOXY ADHESIVE

BACKGROUND OF THE INVENTION

The standard procedure for making B-stageable resins is to dissolve a high molecular weight resin in a solvent. When the solution is applied to a substrate and is heated, the solvent evaporates which leaves a dry coating on the substrate. When heat is applied at a later stage it causes the resin to flow so that it may be used as an adhesive. Additional heat then cures the resin to a permanent hard state.

This technique has several aspects to it which are less than desirable, particularly the production of volatile vapors and the lack of control of the curing mechanism during the drying step. The volatile vapors represent a loss of solvent and may constitute a pollution problem. When the substrate is paper the solvent removal step also removes water from the paper which leads to its embrittlement.

SUMMARY OF THE INVENTION

We have found that a high molecular weight epoxy resin can be dissolved in a low molecular weight epoxy resin or in acrylic monomers or oligomers to form an adhesive which can be dried to the B-stage by ultraviolet radiation. The ability to use an all-epoxy system is surprising because it was expected that the ultraviolet radiation would also cure the high molecular weight epoxy resin. The adhesives of this invention do not decay with time as rapidly as do systems containing acrylic monomers, and the heat cured adhesive properties provide superior bond strength after aging in hot oil.

PRIOR ART

U.S. Pat. No. 4,222,835 discloses an acrylic-based composition which contains both a photoinitiator and a thermal initiator. The composition is cured in a single stage when UV light sets off the photoinitiator which generates sufficient heat to activate the thermal initiator and complete the cure of the resin.

U.S. Pat. No. 3,936,557 discloses a solventless epoxy composition which is cured with UV light in a single stage.

DESCRIPTION OF THE INVENTION

The solventless UV dryable B-stageable epoxy adhesive of this invention contains a thermally curable epoxy, thermal curing agent for the thermally curable epoxy, a liquid UV curable resin, and a UV photoinitiator for the UV curable resin. The composition may also include, as optional ingredients, an accelerator for the thermal curing agent, a reactive diluent, a flow control agent, and a tri or higher functional epoxy.

The thermally curable epoxy is a solid epoxide which is soluble in the liquid UV curable resin and which has a molecular weight between about 650 and about 4000 and preferably between about 900 and about 1500. Lower molecular weight thermally curable epoxies result in blocking and higher molecular weight epoxies result in poor flow at bonding temperatures. Suitable thermally curable epoxies include bisphenol-A epoxides, cycloaliphatic epoxides, and hydantoin epoxies. Bisphenol-A epoxies are preferred as they have been found to work very well and are of lower cost. The thermally curable epoxy is used in an amount of about 40 parts by weight (pbw) to about 70 pbw. A lesser amount results in insufficient residual activity for effective adhesion and a greater amount results in too high a viscosity and blocking after drying. Preferably the amount of thermally curable epoxy is about 45 to about 60 pbw.

The thermal curing agent is a compound which is stable at room temperature and soluble in the adhesive, and which can cure the thermally curable epoxy, preferably at a temperature of less than 200° C. Suitable thermal curing agents include anhydrides such as nadic methylhexahydrophthalic and methyl tetrahydrophthalic anhydride, amines such as dicyandiamide and monoethanolamine, and boron titanates. Anhydrides are preferred as they are more stable. The thermal curing agent is used in an amount from about 70% by weight less than stoichiometric with the thermally curable epoxy to about 50% by weight in excess of stoichiometric, as less results in uncured epoxy and more is unnecessary. The preferred amount of thermal curing agent is stoichiometric up to about 20% (all percentages herein are by weight) in excess of stoichiometric.

The accelerator is an optional ingredient but is preferably present if an anhydride curing agent is used as it speeds up the cure. Suitable accelerators should be soluble in the system and include metal acetyl acetonates such as chromium, iron and cobalt acetates, amines such as diethylenetriamine, and imidazoles such as 2-methyl imidazole and 2-ethyl 4-methyl imidazole. The preferred accelerator is a mixture of about 5 to about 30 parts by weight (pbw) of a methyl tetraydrophthalic anhydride to about 0.01 to about 1 pbw of chromium acetyl acetonate as that accelerator has been found to work the best with anhydride curing agents. If that accelerator is used, it should be used in an amount of about 0.02 to about 0.1 pbw. Generally, accelerators may be used up to about 2 pbw.

The composition also includes a UV curable resin. This resin can be either an epoxy or an acrylic or a mixture of epoxy and acrylic resins. The UV curable epoxy resin is a diluent for the thermally curable epoxy and is a liquid at room temperature. It has a molecular weight of less than about 700. Suitable epoxy resins for use as a UV curable resin include cycloaliphatic epoxides such as limonene dioxide, limonene oxide, and alpha pinene oxide, aliphatic epoxides such as butyl diglycidyl ether, and neopentyl glycol diglycidyl ether. Cycloaliphatic epoxides are preferred as they react faster and more completely with the UV initiator, and limonene dioxide is the preferred cycloaliphatic epoxide as it is a good solvent and has low viscosity. Suitable acrylic UV curable resins include various acrylates and diacrylates. The preferred acrylic is a mixture of acrylates and diacrylates as that is non-blocking, and flows under heat at low pressure. Suitable acrylates include ethoxyethyl acrylate, phenoxy ethyl acrylate, ethyl hexyl acrylate, isobornyl acrylate, and tetrahydro furfuryl acrylate. The preferred acrylate is an alkoxyethyl acrylate as they make better diluents and are more reactive in UV light. Suitable diacrylates include hexane diol diacrylate, tetraethylene glycol diacrylate, and tripropylene glycol diacrylate. The preferred diacrylate is hexanediol diacrylate as it is very good solvent and has low viscosity. The amount of UV curable resin is about 25 to about 60 pbw as less results in too high a viscosity and more results in insufficient residual epoxy functionality for use as an adhesive after drying. The preferred amount is about 30 to about 50 pbw. If the UV curable resin is an epoxy resin the amount used should be about 30 to about 60 pbw and preferably about 35 to about 50 pbw. If the UV curable resin is an acrylate the amount used should be about 25 to about 50 pbw and preferably about 30 to about 40 pbw. If a mixture of epoxy resin and acrylic resin is used the amount should be proportional to the quantities given above.

The UV initiator is a compound which is stable in the absence of UV light but which initiates the cure of the UV curable resin in the presence of UV light. If the UV curable resin is an acrylate then the UV initiator should be a free radical generating UV initiator such as a benzoin ether or a benzophenone. Benzoin ethers are preferred as they produce the fastest drying. If the UV curable resin is an epoxy resin then the UV initiator should be a compound which, in the presence of UV light, liberates a Lewis acid or a Bronsted acid or both. A Lewis acid is a compound which donates electrons and a Bronsted acid is a compound which donates protons. Suitable compounds which produce both Lewis acids and Bronsted acids in the presence of UV light include iodonium salts, sulphonium salts, arsonium salts and diazonium salts. Iodonium salts are preferred as they are readily available. If the UV curable resin is a mixture of an epoxy and an acrylate then the UV initiator should be a proportional mixture of a free radical generating UV initiator and a compound which liberates Lewis acids, Bronsted acids, or both. The amount of UV initiator should be about 1 to about 10 parts by weight and is preferably about 2 to about 4 parts by weight for a free radical liberating UV initiator and about 3 to about 5 parts by weight for a Lewis acid-Bronsted acid liberating UV initiator.

While not required, the adhesive may contain a reactive diluent to lower its viscosity. Reactive diluents are well known in the epoxy art and are generally low molecular weight epoxies. The amount of reactive diluent should be less than 20 parts by weight. If one is used, however, it is generally used at about 5 to about 10 parts by weight.

Another optional ingredient is a flow control agent which helps the adhesive to flow level and wet the surface of the substrate. Flow control agents are also well known in the art and include polyacrylates and organic fluorides. The amount of flow control agent may be up to about 5 parts by weight and is typically about 0.5 to about 2 parts by weight if one is used.

Another optional ingredient is a surfactant which helps the adhesive to wet the surface of the substrate. Surfactants may be anionic, cationic, or nonionic and are well known in the art. The amount of surfactant used should be less than one part by weight and typically about 0.1 to about 0.5 parts by weight of surfactant are used if one is present.

A final optional ingredient is the all-epoxy systems is a tri or higher functional liquid epoxy liquid to prevent blocking. Blocking means that the adhesive sticks to a surface without the application of heat after it has been B-staged. The presence of a tri or higher functional epoxy in the adhesive prevents the B-staged adhesive from sticking. The epoxy is preferably a liquid aliphatic epoxy as they are much more sensitive to radiation than the aromatic epoxies. The amount of trifunctional or higher functional epoxy should be less than 10 part pbw and it is preferably about 2 to about 5 pbw if one is used.

While the adhesive may contain dyes, pigments, or other ingredients if desired it should contain no solvent.

The adhesive is prepared by dissolving the thermally curable epoxy in the UV curable resin at a temperature up to 120° C. It is preferable to keep the temperature under 100° C. to prevent the polymerization of the resins. The mixture is then cooled to less than 80° C. and the thermal curing agent and accelerator or added. The mixture is then cooled to less than 40° C. and the UV initiator and any other optional ingredients are added. Other methods or orders of preparation may also be used.

The adhesive is then applied to a substrate by any suitable technique such as roto-gravure, painting, dipping, or spraying. While the adhesive was specifically designed for use on paper it could also be applied to glass or fabric tapes or webs, wood, or as an overcoat for magnet wire. It can also be used as a duct former in transformers.

After the adhesive has been applied to a substrate it is exposed to UV radiation. The more intense the UV light the shorter will be the time required to dry the adhesive. Once the adhesive is dried the coated substrate can be stored, shipped, or formed into shapes prior to activation of the adhesive.

When it is desired to use the coated substrate it is pressed against another surface to which the substrate is to be bonded and heat is applied which melts the B-staged adhesive causing it to flow and cure. The amount of heat necessary depends on the curing system which was used and temperatures can range from about 80° to about 250° C., but the preferable temperature range is about 100° to about 150° C. The amount of time required to cure the adhesive also depends on the curing system that was used as well as the temperature and can range from a quarter of an hour to 24 hours, but it is preferable to tailor the temperature and curing system so that the cure can be completed in about 2 to about 8 hours.

The following examples further illustrate this invention.

EXAMPLE 1

The substrate used in these examples is an electrical paper sold by Westinghouse Electric Corporation under the trade designation "Insuldur." The adhesives were coated onto the paper to a thickness of 0.001 inch using a roto-gravure technique and then were irradiated with ultraviolet light from 2 medium pressure mercury arcs operating at 200 watts per linear inch. The irradiation continued until the samples were dry to the touch. Then two pieces of paper were placed with the coated sides together with a weight providing a pressure of 2 psi. After 16 hours the pieces of paper were separated and checked for blocking or adhesion. Sample 1 consisted of 60 parts a solid diglycidyl ether of bisphenol A having an epoxy equivalent weight (EEW) of 575 to 700 sold by Dow Chemical Company under the trade designation "DER662," 40 parts limonene dioxide, 4 parts of a cationic UV initiator believed to be an iodonium salt sold by the 3M Corporation under the trade designation "FC508," 0.05 pbw chromium acetyl acetonate, and 20 pbw methyl tetrahydrophthalic anhydride. After coating, paper treated with this composition resulted in extensive adhesion or blocking.

Sample 2 consisted of Sample 1 plus 3 pbw of a high functional aliphatic epoxide sold by Celanese Corporation under the trade designation "5044." Paper treated with this adhesive did not block.

Sample 3 consisted of Sample 1 plus 3 parts of a high functional aliphatic epoxide sold by Celanese under the trade designation "5048." Paper treated with this adhesive did not block.

Sample 4 consisted of the same composition as Sample 2 except that the coating was done on a coating tower. The coated paper was tested by measuring a tensile shear strength and was compared with a standard epoxy. The following table gives the results.

|  | Tensile Strength (psi) | |
| --- | --- | --- |
| Test Conditions | Sample 4 | Standard Epoxy |
| Initial | 81 | 39 |
| 3 months in air at 25° C. | 85 | 16 |
| 2 months in oil at 150° C. | 29 | 4 |

EXAMPLE 2

Sample 1 consisted of 45.5 parts of a bisphenol-A epoxy resin sold by Dow Chemical Company under the trade designation "DER662," 7.6 parts of an epoxy curative sold by Westinghouse Electric Corporation under the trade designation "WT17," 5 parts butyl glycidyl ether, an epoxy diluent sold by Ciba Geigy under the trade designation "RD1," 5 pbw of an epoxy diluent, the diglycidyl ether of neopentyl glycol sold by Wilmington Chemicals under the trade designation "Heloxy 88," 15 pbw hexanediol diacrylate, 20.5 pbw 2 ethoxyethylacrylate, 1.4 pbw benzoin ether sold by Stauffer Chemical under the trade designation "V38," and 0.2 pbw surfactant sold by Rohm & Haas under the trade designation "Triton X100.".

Sample 2 consisted of 60 parts "DER662," 40 pbw limonene dioxine, 0.15 pbs chromium acetyl acetonate, and 20 pbw methyl tetrahydrophthalic anhydride.

Sample 1 used a UV curable resin which was an acrylic and Sample 2 used a UV curable resin which was an epoxy. The samples were resin screen printed onto Insuldur paper and four 2 inch by 2 inch samples were laminated between aluminum sheets at 140° C. for 12 hours with 2 psi pressure. The tensile strength was then measured at 100° C. The following tables give the results of these experiments.

| Sample No. | Initial (No aging) | 4 weeks 25° C. | 6 weeks 25° C. | 8 weeks 25° C. | 14 weeks 25° C. |
| --- | --- | --- | --- | --- | --- |
| 1 | 31.6 |  | 10.4 |  | 5.2 |
| 2 | 77.5 | 77.2 |  | 67.8 |  |

Other specimens of Samples 1 and 2 were prepared in the same manner but were hermetically sealed in Wemco C mineral oil and 150° C. for aging, then were tested at 100° C. The following gives the tensile strength and psi of the samples.

| Sample No. | Initial (No aging) | 1 week in oil at 150° C. | 4 weeks in oil at 150° C. | 8 weeks in oil at 150° C. |
| --- | --- | --- | --- | --- |
| 2 | 77.5 | 34.9 | 14.8 |  |
| 1 | 31.6 | 19.6 | 4.7 | 1.8 |

We claim:

1. A solventless, UV-dryable, B-stageable, epoxy adhesive comprising:

(A) about 40 to about 70 pbw of a solid thermally curable epoxy having a molecular weight between about 650 to about 4,000;
(B) a thermal curing agent for said thermally curable epoxy, stable at room temperature and soluble in said adhesive, in an amount from about stoichiometric to about 50% by weight in excess of stoichiometric;
(C) up to about 2 pbw of an accelerator for said thermal curing agent, soluble in said adhesive;
(D) about 25 to about 60 pbw of a liquid UV curable epoxy resin in which said solid thermally curable epoxy is soluble;
(E) about 1 to about 10 pbw of a UV photoinitiator for said UV curable epoxy resin; and
(F) up to about 20 pbw of a reactive diluent;
(G) up to about 5 pbw of a flow control agent;
(H) up to about 1 pbw of a surfactant; and
(I) about 2 to about 10 pbw of a tri or higher functional epoxy.

2. An adhesive according to claim 1 wherein the amount of said thermally curable epoxy is about 45 pbw to about 60 pbw, the amount of said thermal curing agent is about stoichiometric up to about 20% in excess of stoichiometric, the amount of said liquid UV curable epoxy resin is about 30 to about 60 pbw, the amount of said UV photoinitiator is about 3 to about 5 pbw of a compound which generates Lewis acid, a Bronsted acid or mixture thereof.

3. An adhesive according to claim 1 wherein said reactive diluent, if present, is present at about 5 to about 10 pbw, said flow control agent, if present, is present at about 0.5 to about 2 pbw, said surfactant, if present, is present at about 0.1 to about 0.5 pbw and said tri or higher functional epoxy is present at about 2 to about 5 pbw.

4. An adhesive according to claim 1 wherein said UV curable resin is a cycloaliphatic epoxy.

5. An adhesive according to claim 4 wherein said cycloaliphatic epoxy is limonene dioxide.

6. An adhesive according to claim 1 wherein said thermally curable epoxy is a bisphenol-A epoxy.

7. An adhesive according to claim 1 wherein said thermal curing agent is an anhydride.

8. An adhesive according to claim 7 wherein said anhydride is a methyl tetrahydrophthalic anhydride and is used in combination with an accelerator of chromium acetyl acetonate.

9. An adhesive according to claim 1 wherein said UV initiator is an iodonium salt.

10. An adhesive according to claim 1 wherein said thermally curable epoxy has a molecular weight of about 900 to about 1500.

11. An adhesive according to claim 1 prepared by dissolving said thermally curable epoxy in said UV curable epoxy resin at a temperature of less than 120° C., cooling to less than 80° C., adding said curing agent and said accelerator, cooling to less than 40° C., and adding any remaining ingredients.

12. A substrate coated with an adhesive according to claim 1 which has been cured to the B-stage.

13. A substrate according to claim 12 wherein said substrate is treated kraft paper.

14. A substrate according to claim 12 wherein said adhesive has been cured with heat.

15. An adhesive according to claim 1 wherein said tri or higher functional epoxy is a liquid aliphatic epoxy.

16. A substrate according to claim 12 wherein said adhesive is cured and binds a second substrate to said substrate.

* * * * *